United States Patent [19]

Buckley

[11] 4,216,260
[45] Aug. 5, 1980

[54] POLYESTER COMPOSITIONS AND ARTICLES SIZED THEREWITH

[75] Inventor: Herman T. Buckley, Columbus, Ga.

[73] Assignee: Calloway Chemical Company, Columbus, Ga.

[21] Appl. No.: 910,114

[22] Filed: May 30, 1978

Related U.S. Application Data

[62] Division of Ser. No. 769,305, Feb. 11, 1977, abandoned.

[51] Int. Cl.² .................................................. B32B 7/00
[52] U.S. Cl. .................................... 428/261; 427/395; 428/262; 428/265; 428/290; 428/480; 428/483; 428/514
[58] Field of Search ............... 428/261, 262, 265, 290, 428/480, 483, 514; 427/395; 260/75

[56] References Cited

U.S. PATENT DOCUMENTS

| | | | |
|---|---|---|---|
| 3,546,008 | 12/1970 | Shields et al. | 260/40 P X |
| 3,694,257 | 9/1972 | Dumont | 428/262 |
| 3,749,758 | 7/1973 | Gannon | 260/75 R X |
| 4,035,531 | 7/1977 | Lark | 428/483 X |

*Primary Examiner*—George F. Lesmes
*Assistant Examiner*—E. Rollins Buffalow
*Attorney, Agent, or Firm*—Larson, Taylor and Hinds

[57] ABSTRACT

Articles of manufacture derived from fibrous materials sized with a novel sizing composition comprising a water-soluble salt of a linear polyester derived essentially from components (A) at least one dicarboxylic acid component, and
(B) at least one polyol component, at least 10 mole percent of said polyol being a carboxylic acid-substituted diol having the structure:

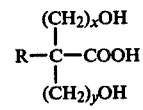

wherein R is lower alkyl, and x and y are integers of 1 to 3, said polyester having an acid number of about 80 to 90 and a hydroxyl:carboxyl ratio of 1.3 to 1.8:1.

18 Claims, No Drawings

POLYESTER COMPOSITIONS AND ARTICLES SIZED THEREWITH

This is a division of application Ser. No. 769,305 filed Feb. 11, 1977, now abandoned.

FIELD OF THE INVENTION

This invention relates to water-soluble salts of polyester compositons having excellent adhesive properties. More particularly this invention relates to the use of said compositions in the sizing of articles of manufacture derived from fibrous materials and to novel sized articles obtained thereby.

BACKGROUND OF THE INVENTION

In the textile industry it is quite common to treat yarns with a sizing composition before they are subjected to the weaving process. In this sizing treatment the size composition adheres to and binds together filaments of the yarn thereby strengthening the yarn. A strengthened yarn is of course desirable since it is more resistant to abrasion and breaking during the subsequent weaving operation.

Many types of high molecular weight materials have been used in the past as sizing agents in the sizing of textiles. These sizing agents include, for instance, starch, starch derivatives, gelatin, polyvinyl alcohol, acrylics, alkali metal salts of maleic anhydride/styrene copolymers, and sulfonic acid metal salt derivatives of polyesters. Since most prior art sizes interfere with subsequent finishing steps they must be removed by a scouring operation before these finishing steps can be performed. Unfortunately, some of the prior art sizes are not effectively removed by scouring. Others are not readily compatible with or do not adhere well to synthetic textile yarns such as polyester yarn and thus do not form a satisfactory protective coating thereon. Yet others, while providing a removable coating, are either too expensive or impart an unsatisfactory degree of abrasion resistance.

Similarly, it is quite common in paper manufacture to size the paper either internally or externally with sizing agents to endow the paper with a number of desirable characteristics such as strength, water-repellency, ink "hold-out", (i.e. good printing qualities) and the like. Many of the paper sizes conventionally employed in these paper treating operations are not without their shortcomings. For example, a common complaint of conventional surface sizing agents is their inability to prevent "dusting" during high speed printing operations. The undesirable phenomena termed "dusting", sometimes referred to as "linting" is the result of the dust-like particles produced by the breaking off from the surface of the paper of small particulates such as protruding fibers and surface matter which have not adhered properly to the substrate. Another frequent shortcoming of conventional surface sizes is the "tackiness", however slight, that is detected in the resulting coating. Tackiness can cause paper surfaces to stick together, which is referred to in the paper trade as "blocking." Internal sizes of the prior art are frequently faulted for their inability to endow the paper with satisfactory bursting strengths.

OBJECTS

It is an object of the invention therefore to provide a composition of the polyester type which not only possesses excellent adhesion to articles but is easily and effectively removed therefrom. This object is noteworthy since polyesters for textile application in general are not considered good adhesives and are ordinarily poor sizes. The only ones recognized as having any utility as sizes are those whose properties have been significantly altered at considerable expense as, for instance, by conversion to the sulfonic acid metal salt derivatives such as described in U.S. Pat. No. 3,546,008 to Shields et al.

A further object of the invention is to provide water-soluble salt compositions of the polyester type useful as sizing compositions which can be easily solubilized and/or desized without the need of a co-solvent.

Another object of the invention is to provide fibrous materials sized with a sizing composition that possesses excellent adhesion to fibrous articles produced from synthetic fibers, particularly polyester fibers, as well as to fibrous articles prepared from natural fibers.

Yet another object of the invention is to provide a fibrous article sized with a sizing composition which sized article exhibits all of the characteristics necessary for acceptable weaving performance.

A further object of the invention is to provide a low cost sized fibrous article which is equal to or better than the more conventional prior art sizes in both weaving efficiencies and ease of removability.

Another object of the invention is to provide a fibrous article sized with a sizing composition of the polyester type characterized by improved color stability when the sized article is subjected to high heat setting temperatures.

It is also an object of the invention to provide an internally, and/or externally treated paper of improved bursting strength.

Lastly, it is an object of the invention to provide an internally or externally sized paper free of tackiness and dusting characteristics.

SUMMARY OF THE INVENTION

The above and other objects of the invention are obtained by the use of a composition comprising a water-soluble salt of a linear, polyester derived from components:

(A) at least one dicarboxylic acid component and
(B) at least one polyol, at least 10 mole percent of which is a carboxylic acid-substituted diol having the structure:

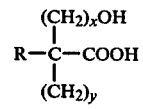

wherein R is lower alkyl, say of 1 to 4 carbon atoms, x and y are integers of 1 to 3, said polyester having an acid number of about 80 to 90 and a hydroxyl carboxyl ratio of 1.3 to 1.8:1.

The term "hydroxyl:carboxyl ratio" as used herein and in the appended claims means the ratio of the number of reactive hydroxyl groups in the polyol component to the number of reactive carboxyl groups in the dicarboxylic acid component.

In a preferred aspect of the invention water-soluble salts are provided which not only possess all of the characteristics necessary in an acceptable size but also are removable with water alone, that is, without the use of co-solvents.

These compositions are the water-soluble salts of the above linear polyester wherein the polyol component selected comprises 40 to 60 mole percent of a liquid alkylene glycol of 2 to 8 carbon atoms and 60 to 40 mole percent of said carboxylic acid-substituted diol.

In another aspect, the present invention involves a sizing process whereby the aforementioned objects are achieved, which process comprises sizing the article with a size composition described above.

It has been surprisingly found that if the objects of the invention are to be achieved it is important that the acid value and the hydroxyl:carboxyl ratio be in the defined range and that the components of the polyester be selected from the members of the receited groups. Polyesters of components of the invention which do not possess the recited acid values and hydroxyl:carboxyl ratios will not meet the objectives of the invention. Conversely, polyesters of different components even if meeting the defined acid values and hydroxyl:carboxyl values likewise fail to provide the desired characteristics.

The criticality of the acid value range resides in the finding that if the polyester product contains an acid number higher than about 90, the product possesses undesirable tackiness while polyester products with acid numbers lower than about 80 possess undesirable brittleness.

Similarly, if the hydroxyl:carboxyl ratio is higher than about 1.8:1 results in a polyester of undue tackiness while hydroxyl:carboxyl ratios below about 1.3:1 results in undesirable gellation and brittleness in the final product.

DETAILED DESCRIPTION OF THE INVENTION

Illustrative of suitable carboxylic acid-substituted diols whose presence is essential in the polyol component employed in preparation of the polyester are:
2-methyl-2-carboxy propane diol
2-methyl-2-carboxy butane diol
2-methyl-2-carboxy pentane diol
3-methyl-3-carboxy pentane diol
2-methyl-2-carboxy hexane diol
3-methyl-3-carboxy hexane diol
4-methyl-4-carboxy hexane diol
2-ethyl-2-carboxy propane diol
2-ethyl-2-carboxy butane diol
2-ethyl-2-carboxy pentane diol
3-ethyl-3-carboxy pentane diol
2-ethyl-2-carboxy hexane diol
3-ethyl-3-carboxy hexane diol
4-ethyl-4-carboxy hexane diol
2-propyl-2-carboxy propane diol
2-propyl-2-carboxy pentane diol
3-propyl-3-carboxy pentane diol
2-propyl-2-carboxy hexane diol
3-propyl-3-carboxy hexane diol
4-propyl-4-carboxy hexane diol
2-butyl-2-carboxy propane diol
2-butyl-2-carboxy butane diol
2-butyl-2-carboxy pentane diol
3-butyl-3-carboxy pentane diol
2-butyl-2-carboxy hexane diol, and
3-butyl-3-carboxy hexane diol Any water-soluble salts of the carboxylic acid-substituted diols are useful in the invention provided they do not impart a deleterious or undesired effect on the article treated. Illustrative of suitable salts of the diols are alkali metal salts, alkaline earth metal salts, ammonium salts, di- and tri-alkanol amine salts and di- and tri-alkylamine salts thereof. Thus the preferred substituted diol component of the invention can be represented as follows:

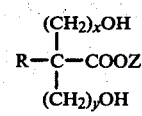

wherein R, x, and y are as defined above and z is H, an alkali metal (e.g. Na, K and Li) ion, an alkali earth metal (e.g. Ca, Ba, Mg) ion, ammonium salts, dialkanolamine group, trialkanolamine group, dialkylamine group and a trialkylamine group. The preferred alkali metal is sodium while the preferred alkaline earth metal is calcium. The preferred di- and tri-alkanolamines are the di- and tri-lower alkanolamines such di- and tri-ethanolamines, di- and tri-propanolamines and tri-butanolamines. Similarly, the preferred dialkylamine and trialkylamine groups are the di- and tri- (lower alkyl) amines such as dimethylamine, diethylamine, dipropylamine, trimethylamine, triethylamine, tripropylamine, and the like.

It should be understood that when Z is other than H it can be provided on the carboxylic acid portion of the diol component either before or after formation of the polyester.

As aforementioned, the carboxylic acid-substituted diol comprises at least 10 mole percent of the polyol component used in the polyester formation and may comprise all, that is, 100 mole percent. Preferably, however, the carboxylic acid-substituted diol is used in admixture with other polyols in proportions that amount to about 20 to 40 mole percent of the polyol mixture.

The polyols that may be employed together with the carboxylic acid-substituted diol to produce polyesters useful in this invention are preferably polyhydric alcohols of 2 to 8 carbon atoms such as ethylene glycol, diethylene glycol; propylene glycol; 1,3-propane diol; 2,4-dimethyl-2-ethylhexane-1,3-diol; 2,2-dimethyl-1,3-propane diol; 2-ethyl-2-butyl-1, 3-propane diol; 2-ethyl-2-isobutyl-1, 3-propane diol; 1,3-butane diol; 1,4-butane diol; 1,5-pentane diol; 1,6-hexane diol; 2,2,4-trimethyl-1, 6-hexane diol; trimethylol propane; pentaerythritol; neopentyl glycol, and the like.

As previously mentioned, where it is desired to provide a water-soluble salt of a polyester of the invention that requires no co-solvent for complete solubility and ready removal, it is important that a sufficient amount of liquid alkylene glycol be employed together with the carboxylic acid-substituted diol. Exemplary of suitable liquid alkylene glycols are any of the cited liquid alkylene glycols.

The polycarboxylic acids which can be employed as the dicarboxylic acid component to produce the polyesters useful in the present invention include aliphatic polycarboxylic acids of 4 to 8 carbon atoms and the aryl polycarboxylic acids. Suitable aliphatic polycarboxylic acids are exemplified by adipic acid, succinic acid, glutaric acid, sebacic acid, azelaic acid, and the like. Examples of suitable aromatic polycarboxylic acids include, among others, phthalic acid, isophthalic acid, terephthalic acid, trimellitic acid, and pyromellitic acid.

It should be understood that the use of the corresponding acid anhydrides, esters, and acid chlorides of these acids is included in the term "dicarboxylic acid".

The polyesters useful in the present invention can be prepared utilizing any of the conventional esterfication techniques well known in the art. In general, polyesters of the invention can be easily prepared by combining the polyol component and dibasic acid component with a slight excess of the polyol component, and heating the mixture of reactants to esterification temperatures, usually in the range of about 200° to 600° F. and preferably under a blanket of inert gas such as $CO_2$. When the condensation is complete that is, when the acid value is in the range of about 80 to 90, the polyester is neutralized with a suitable base, preferably to give a polyester having a pH greater than 6.

The novel composition of the invention find general utility as adhesives and can be applied effectively as such to a variety of substrates such as wood, rubber, glass, steel, plastic (e.g. polyester fibers and films and vinyl films) and the like. The compositions have found particular utility, however, as sizes in the production of articles of manufacture derived from fibrous materials. Such articles of manufacture include for instance, fibrous articles prepared from natural fibers, synthetic fibers and blends thereof, and cellulosic articles such as paper. Thus the compositions can be used to size fibrous articles such as textile yarns, rope, tire cord, etc. or they can be used on the surface (external) sizing or internal sizing of paper. In the sizing of textile yarn, the compositions of the invention have been found especially useful in the sizing of polyester yarn. The compositions of the present invention can be applied to the articles by any of the convenient means known to the art and when used as sizing compositions they can be applied alone or in admixture with other conventional sizing agents as, for example, starch, starch derivatives, polyvinyl alcohol, and the like. In the sizing of fibrous materials, such as yarns, application can be effected, for instance, by simply immersing or passing the fibrous article through a solution of the polyester in a suitable solvent, preferably water. The sized fibrous article is then dried to remove the solvent and provide a sized fibrous article containing, in general, about 1 to 20% of the polyester by weight based on the combined weight of the polyester and the fibrous article. If desired, other non-interfering substituents such as soaps, lubricants, waxes and the like, can be present in the solution of polyester with which the fibrous article is treated.

In the sizing of paper any of the conventional surface sizing or internal sizing techniques known to the art can be employed. For instance, internal sizing is generally practiced by incorporating small amounts of the polyester sizing agent, to impart thereto strength and/or a reduction in water absorbency, into conventional paper stocks comprising for example, wood or rag pulp and uniformly distributing the sizing agent throughout the stock. The resulting stock is then formed into paper by conventional paper making techniques and machines. The exact amount of size added to the paper stock will vary depending principally upon the particular paper stock used but amounts sufficient to impart to the paper strength and/or reduction in water absorbency should be utilized. Generally, the amounts of sizing agent employed fall in the range of about 0.1 to 3 percent by weight of the pulp on a dry bases.

Surface sizing of paper using the polyester sizing agent can also be effected conveniently by conventional techniques and conventional equipment such as sizing equipment. One simple technique comprises dipping the paper in an aqueous solution of the polyester sizing agent; followed by removal of the excess coating. This operation may be repeated several times in order to build up a sufficiently heavy layer or coating. It is preferred, however, to apply the sizing agent as an alkaline aqueous solution to the paper after it has been formed and suitably dried, by use of knife applicators. Most frequently, however, the size composition is applied by introducing it into the calender unit of the paper making machine. Again the specific amount of sizing agent will vary depending upon the type of paper sized but generally it will fall in the range of about 0.05 to 0.5 pounds of the polyester sizing composition per 1000 square feet of paper.

The following examples are included to better illustrate the synthesis of polyesters useful in the present invention.

EXAMPLE 1

| Ingredient: | Moles | Grams |
|---|---|---|
| Dimethylolpropionic acid (2-methyl-2-carboxy propane diol) | 3 | 105.2 |
| Trimethylolpropane | 4 | 140.3 |
| Phthalic anhydride | 3 | 116.2 |
| Adipic acid | 1 | 38.2 |

All the ingredients but the adipic acid are charged to a three-neck glass reactor fitted with a mechanical stirrer, thermometer, water separator, and a reflux condensor.

The charge is heated to 340°–350° F. range under a $CO_2$ blanket and reacted at this temperature for a period of 15 minutes. The adipic acid is then added and the whole charge heated to 390° F. for a period of 2½ hours at which point the acid value is 82.

The reaction mix is cooled to 220° F. and an alkaline solution containing 19.2 grams of sodium hydroxide in 454.8 grams of water at 160° F. is added to the polyester mix.

A clear solution of the sodium salt of the polyester having a pH of 8.5 results.

EXAMPLE 2

| Ingredient: | Moles | Grams |
|---|---|---|
| Dimethylolpropionic acid | 3 | 64.5 |
| Neopentyl glycol | 3.25 | 54.1 |
| Phthalic anhydride | 3 | 71.2 |
| Isophthalic acid | 1 | 26.6 |

All ingredients are charged to a three-neck glass reactor fitted with a mechanical stirrer, thermometer, water separator, and a reflux condenser.

The charge is heated to 420° F. and maintained at that approximate temperature until the acid value is 85.

The reaction mix is then cooled to 340° F. and 40 grams of monobutyl ether of ethylene glycol is added. On cooling to 220° F. an alkaline solution containing 18 grams of aqua ammonia (26° Be) in 550 grams of water at 160° F. is added.

A clear solution of ammonium salt of the polyester having a pH of 8.6 results.

EXAMPLE 3

| Ingredient: | Moles | Grams |
| --- | --- | --- |
| Dimethylolpropionic acid | 3.0 | 65.3 |
| Diethylene glycol | 3.0 | 51.6 |
| Phthalic anhydride | 3.0 | 72.1 |
| Isophthalic acid | 1.0 | 27.0 |

All the ingredients are charged to a three-neck glass reactor fitted with a mechanical stirrer, thermometer, water separator, and a reflux condenser.

The charge is heated to 410° F. and maintained at approximately that temperature until the acid value is 81.

The reaction mix is then cooled to 220° F. and an alkaline solution of 14 grams of aqua ammonia (26° Be) in 508 grams of water at 160° F. is added.

A clear solution of the ammonium salt of the polyester having a pH of 6.3 is obtained. The importance of the carboxylic acid-substituted-diol is shown by the following example:

EXAMPLE 4

| Ingredient: | Mole Ratio | Grams |
| --- | --- | --- |
| Neopentyl glycol | 6.25 | 111.4 |
| Phthalic anhydride | 3.0 | 76.1 |
| Isophthalic acid | 1.0 | 28.5 |

All the ingredients are charged to a three-neck glass reactor fitted with a mechanical stirrer, thermometer, water separator, and a reflux condenser.

The charge is heated to 410° F. over a period of 2 hours at which time the acid value is 73.

The reaction mix is cooled to 340° F. and 16 grams of a monobutyl ether of ethylene glycol is added. On cooling to 220° F. an alkaline solution containing 14.4 grams of sodium hydroxide in 580.6 grams of water at 160° F. is added.

The resultant polyester fails to go into solution, dispersion, or emulsion. The separated, top liquid phase had a pH of 6.9, and the bottom substance was soft, tacky, non-film forming substance.

EXAMPLE 5

Sized yarns are prepared by passing single strands of polyethylene terephthalate through solutions of the polyesters prepared in Examples 1, 2 and 3 at room temperature. The yarns thus treated when agitated in water heated to a temperature of 160° F. for 5 minutes and dried are found to be completely free of the size of the present invention. It is of particular importance to note that the salt of the polyester of Example 3 was completely removed without the uses of the co-solvent required in Examples 1 and 2.

EXAMPLE 6

The alkaline solution of the polyester prepared in Example 2 is applied to the back and surface of an unbleached linerboard paper at the calender stack in an amount of 0.06 pounds (solids basis)/1000 square feet of the paper.

For purposes of comparison, the back and surface of unbleached linerboard paper is sized in a similar manner but with 0.13 pounds of polyvinyl alcohol (solids basis)/1000 square feet of the paper.

The coated papers thus prepared are over-printed on a high speed rotogravure printing machine and the "dusting" characteristics of each are visually compared. The paper sized with the polyester of Example 2 is found to possess markedly improved dusting characteristics.

On drying, the surfaces of the sized papers when tested by touch for tackiness show the paper coated with the polyester of Example 2 to be free of tackiness while the polyvinyl alcohol-coated paper exhibits a degree of tackiness.

EXAMPLE 7

The alkaline solution of polyester prepared in Example 2 is used to internally size paper by applying the solution to the head stock of unbleached paper pulp having a consistency of 0.6% solids. The resulting pulp is then formed into liner board paper by a 13 inch pilot paper making machine. The linerboard paper thus sized is tested for bursting strength by subjecting the sized paper to the Mullen Strength test. For purposes of comparison the same liner board uncoated and coated with conventional starch and acrylamide sizing agents is also tested. The results are summarized in the following table.

| | Mullen Strength (1 lb/sq.in.) | Percent Improvement Over Blank |
| --- | --- | --- |
| 1. No Chemical Addition | 8.45 | — |
| 2. ¼% Example 6 Polyester | 10.40 | 23.1% |
| 3. ¼% Cationic Starch | 8.90 | 5.3% |
| 4. ¼% Polyacrylamide | 9.90 | 17.2% |

The data demonstrates the improved bursting strength provided by the polyester size of the present invention over conventional starch and polyacrylamide sizing agent.

The following Examples are included to illustrate the importance of the acid value of the polyesters of the present invention.

EXAMPLE 8

Example 3 is repeated but the mixture is heated until the acid value is 110. The resulting ammonium salt of the polyester is water-soluble but produces an undesirably tacky film.

EXAMPLE 9

Example 3 is repeated but the mixture is heated until the acid value is 79. The resulting polyester changes immediately into a gel prior to neutralization necessitating the use of a solvent to overcome this serious objection.

It is claimed:

1. An article of manufacture derived from paper and textile fibrous material sized with a sizing composition containing a water-soluble salt of a linear polyester derived essentially from components
   (A) at least one dicarboxylic acid component, and
   (B) at least one polyol component, at least 10 mole percent of said polyol being a carboxylic acid-substituted diol having the structure:

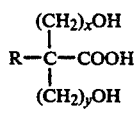

wherein R is lower alkyl, and x and y are integers of 1 to 3, said polyester having an acid number of about 80 to 90 and a hydroxyl:carboxyl ratio of 1.3 to 1.8:1.

2. The sized article of claim 1 wherein R in the carboxylic acid-substituted diol is methyl.

3. The sized article of claim 1 wherein both x and y in the structure of the carboxylic acid-substituted diol are 1.

4. The sized article of claim 1 wherein the carboxylic acid-substituted diol is dimethylolpropionic acid.

5. The sized article of claim 1 wherein the diol component B comprises a mixture of at least one polyol and said carboxylic acid-substituted diol.

6. The sized article of claim 5 wherein the liquid alkylene glycol is diethylene glycol.

7. The sized article of claim 5 wherein the polyol component B is comprised of 20 to 40 mole percent of said carboxylic acid-substituted diol.

8. The sized article of claim 6 wherein the carboxylic acid-substituted diol is dimethylolpropionic acid.

9. The sized article of claim 6 wherein the polyol is selected from the group consisting of diethylene glycol, neopentyl glycol, trimethylolpropane and mixtures thereof.

10. The sized article of claim 7 wherein the liquid alkylene glycol is diethylene glycol.

11. The sized article of claim 1 wherein the dicarboxylic acid component is selected from at least one of phthalic acid, adipic acid, and trimellitic acid.

12. The sized article of claim 1 wherein the water-soluble salt is an alkali metal salt.

13. The sized article of claim 1 wherein the water-soluble salt is an ammonium salt.

14. The sized article of claim 1 wherein the article is a textile yarn.

15. The sized article of claim 1 wherein the article is paper.

16. The sized article of claim 1 wherein the size is a surface size.

17. The sized article of claim 1 wherein the size is an internal size.

18. A method of sizing article derived from fibrous material which comprises sizing said articles with a sizing composition comprising water-soluble salt of a linear, polyester derived essentially from components:
(A) at least one dicarboxylic acid component, and
(B) at least one polyol component, at least 10 mole percent of said polyol being a carboxylic acid-substituted diol having the structure:

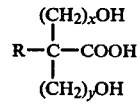

wherein R is lower alkyl, and x and y are integers of 1 to 3, said polyester having an acid number of about 80 to 90 and a hydroxyl:carboxyl ratio of 1.3 to 1.8:1.

* * * * *